US012392930B2

(12) United States Patent
Fan et al.

(10) Patent No.: US 12,392,930 B2
(45) Date of Patent: Aug. 19, 2025

(54) META-CRYSTALS SLABS FOR GENERAL OPTICAL CONVOLUTION AND METHODS FOR DESIGNING META-CRYSTAL SLABS

(71) Applicant: Toyota Motor Engineering & Manufacturing North America, Inc., Plano, TX (US)

(72) Inventors: Shanhui Fan, Stanford, CA (US); Weiliang Jin, Sunnyvale, CA (US); Cheng Guo, Stanford, CA (US); Nathan Zhao, Santa Clara, CA (US); Haiwen Wang, Stanford, CA (US); Sean P. Rodrigues, Ann Arbor, MI (US)

(73) Assignees: Toyota Motor Engineering & Manufacturing North America, Inc., Plano, TX (US); Toyota Jidosha Kabushiki Kaisha, Toyota (JP); The Board of Trustees of the Leland Stanford Junior University, Stanford, CA (US)

( * ) Notice: Subject to any disclaimer, the term of this patent is extended or adjusted under 35 U.S.C. 154(b) by 441 days.

(21) Appl. No.: 18/077,604

(22) Filed: Dec. 8, 2022

(65) Prior Publication Data

US 2023/0176248 A1   Jun. 8, 2023

Related U.S. Application Data

(60) Provisional application No. 63/287,145, filed on Dec. 8, 2021.

(51) Int. Cl.
*G02B 1/00* (2006.01)
*G02B 5/18* (2006.01)
(Continued)

(52) U.S. Cl.
CPC .......... *G02B 1/005* (2013.01); *G02B 5/1866* (2013.01); *G02B 5/203* (2013.01); *G02B 27/46* (2013.01)

(58) Field of Classification Search
None
See application file for complete search history.

(56) References Cited

U.S. PATENT DOCUMENTS 10,928,551 B2    2/2021   Guo et al.
11,120,332 B2    9/2021   Bowen et al.
(Continued)

OTHER PUBLICATIONS

Wang et al., "Design of Compact Meta-Crystal Slab for General Optical Convolution", ACS Photonics, vol. 9, issue 4, Mar. 9, 2022, pp. 1358-1365. (Year: 2022).*
(Continued)

*Primary Examiner* — Derek S. Chapel
(74) *Attorney, Agent, or Firm* — Christopher G. Darrow; DARROW MUSTAFA PC

(57) ABSTRACT

A meta-crystal slab includes photonic structure with an input surface and an output surface, and a plurality of first voxels with a first permittivity and a plurality of second voxels with a second permittivity not equal to the first permittivity disposed between the input surface and the output surface. The photonic structure has a periodicity greater than an operating photonic wavelength 'λ' for general convolution by the photonic structure and the photonic structure is configured to provide an output image with a convolution of an input image.

20 Claims, 15 Drawing Sheets

(51) Int. Cl.
   *G02B 5/20*   (2006.01)
   *G02B 27/46*  (2006.01)

(56) References Cited

U.S. PATENT DOCUMENTS

| | | |
|---|---|---|
| 2017/0363931 A1* | 12/2017 | Rumpf .................... G02F 1/293 |
| 2020/0250532 A1 | 8/2020 | Shen et al. |
| 2021/0006377 A1 | 1/2021 | Hooli et al. |
| 2021/0063717 A1 | 3/2021 | Valentine et al. |
| 2021/0201126 A1 | 7/2021 | Meng et al. |
| 2021/0278566 A1 | 9/2021 | Guo et al. |

OTHER PUBLICATIONS

Abdollahramezani et al., "Meta-optics for spatial optical analog computing," Nanophotonics, vol. 9, No. 13, Jul. 29, 2020, pp. 4075-4095.

Cottle et al., "Optical Convolutional Neural Networks—Combining Silicon Photonics and Fouier Optics for Computer Vision," Optalysys, Dec. 19, 2020, pp. 1-11.

Meng et al., "Optical meta-waveguides for integrated photonics and beyond," Light: Science & Applications, vol. 10, article No. 235, Nov. 22, 2021, pp. 1-44.

Wang et al., "Suppelementary material for: Meta-crystal slab for general optical convolution," ACS Photonics, vol. 9, Issue 4, Mar. 9, 2022, pp. S1-S6.

* cited by examiner

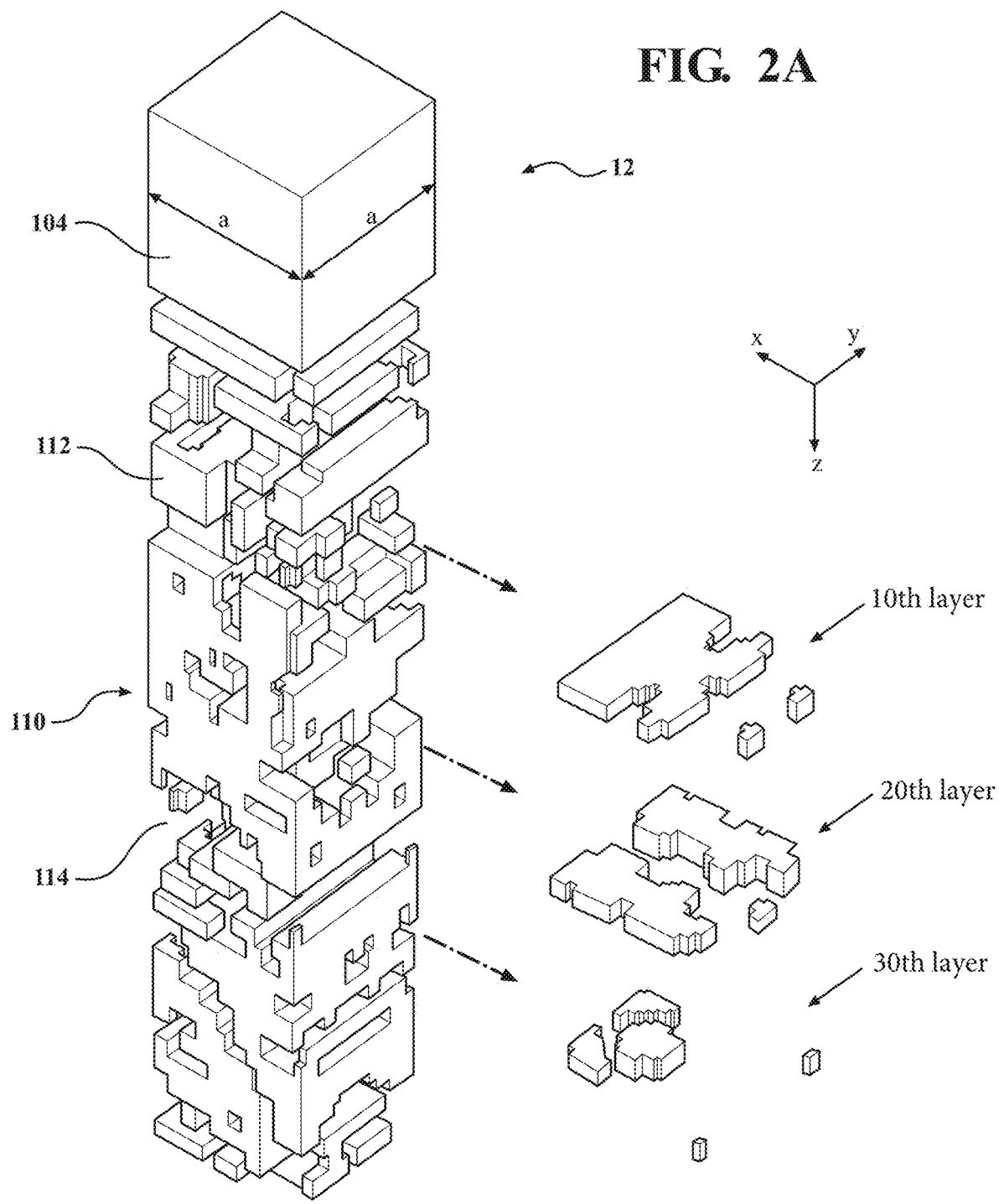

META-CRYSTALS SLABS FOR GENERAL OPTICAL CONVOLUTION AND METHODS FOR DESIGNING META-CRYSTAL SLABS

CROSS REFERENCE TO RELATED APPLICATIONS

This application claims benefit of U.S. Provisional Application No. 63/287,145 filed on Dec. 8, 2021, which is herein incorporated by reference in its entirety.

TECHNICAL FIELD

The present disclosure relates to photonic structures and particularly to photonic structures for optical convolution.

BACKGROUND

Photonic structures have been studied for use as computing hardware due to their fast processing speed, low energy cost, and enhanced parallelism. In addition, algorithms and neural networks in image processing rely on convolution to modify an image (e.g., blurring), find relevant structures in an image (e.g., edge detection) and/or infer arbitrary features (e.g., machine learning), and convolution is often one of the first steps in an image processing pipeline. And while convolution operations have been demonstrated in optics employing Fourier optics approaches, such systems often require a 4f system that is bulky and difficult to integrate.

The present disclosure addresses issues related photonic structures for optical convolution, and other issues related to photonic structures.

SUMMARY

This section provides a general summary of the disclosure, and is not a comprehensive disclosure of its full scope or all of its features.

In one form of the present disclosure, a meta-crystal slab includes a photonic structure with an input surface and an output surface, and a plurality of first voxels with a first permittivity and a plurality of second voxels with a second permittivity not equal to the first permittivity disposed between the input surface and the output surface. The photonic structure has a two-dimensional periodicity equal to 'a', the periodicity is greater than an operating photonic wavelength 'λ' for general convolution by the photonic structure, and the photonic structure is configured to provide an output image with at least one spatial differentiation of an input image.

In another form of the present disclosure, a meta-crystal slab includes a photonic structure having an input surface and an output surface, and a plurality of first voxels with a first permittivity and a plurality of second voxels with a second permittivity not equal to the first permittivity disposed between the input surface and the output surface. The photonic structure has a two-dimensional periodicity equal to 'a', the periodicity is greater than an operating photonic wavelength 'λ' for a general convolution by the photonic structure, and the photonic structure configured to provide an output image with at least one spatial differentiation of an input image. And the at least one spatial differentiation comprising a convolution defined as $E_{out}(x,y)=\int_{-\infty}^{+\infty} t(x-x', y-y') E_{in}(x',y')dx'dy'$, where $E_{in}(x,y)$ is an input two-dimensional input optical field, $t(x,y)$ is a convolution kernel, and $E_{out}(x,y)$ is an output two-dimensional field from the photonic structure.

In still another form of the present disclosure, a meta-crystal slab includes a photonic structure having an input surface and an output surface, and a plurality of first voxels with a first permittivity and a plurality of second voxels with a second permittivity not equal to the first permittivity disposed between the input surface and the output surface. The photonic structure has a two-dimensional periodicity equal to 'a', the periodicity being greater than an operating photonic wavelength 'λ' for a general convolution by the photonic structure, and a thickness between the input surface and the output surface being less than 20 times the operating photonic wavelength λ. The photonic structure is configured to provide at least one spatial differentiation of an input image and the at least one spatial differentiation defined as $E_{out}(x,y)=\int_{-\infty}^{+\infty} t(x-x',y-y') E_{in}(x',y')dx'dy'$, where $E_{in}(x,y)$ is an input two-dimensional input optical field, $t(x,y)$ is a convolution kernel, and $E_{out}(x,y)$ is an output two-dimensional output field from the photonic structure.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 2A shows a possible realization of a unit cell for a meta-crystal slab according to the teachings of the present disclosure that gives the transmission function shown in FIG. 2C;

FIGS. 4A-4L show several designed transmission functions and corresponding convolution kernels with: FIG. 4A showing a designed Gaussian transmission function; FIG. 4B showing a corresponding convolution kernel for FIG. 4A; FIG. 4C showing the designed topological differentiation kernel with Gaussian envelope (where the polynomial $P(k_x,k_y)$ defined below is proportional to $k_x+ik_y$) in wavevector space in absolute value; FIG. 4D showing a corresponding convolution kernel of FIG. 4C in real space in absolute value; FIG. 4E showing the phase for the designed transmission function in FIG. 4C; FIG. 4F showing the corresponding topological differentiation convolution kernel for FIG. 4C in real space; FIG. 4G showing a designed transmission function for second-order differentiation kernel with a Gaussian envelope; FIG. 4H showing a corresponding convolution kernel for FIG. 4G in real space; FIG. 4I showing a designed transmission function for Laplacian of Gaussian (LoG); FIG. 4J showing a corresponding convolution kernel for FIG. 4I in real space; FIG. 4K showing a designed transmission function for mixed derivative kernel with a Gaussian envelope; and FIG. 4L showing a corresponding convolution kernel for FIG. 4K in real space.

DETAILED DESCRIPTION

The present disclosure provides meta-crystal slabs for general implementation of optical convolution. In some variations, the meta-crystal slabs are inverse designed to provide a desired convolution kernel. The meta-crystal slabs are compact and compute directly on incident optical image fields. That is, the meta-crystal slabs according to the teachings of the present disclosure can perform desired convolutions directly on incident optical image fields without the need for additional encoding and/or decoding. As used herein, the phrase "meta-crystal slab" refers to a photonic structure with a periodicity equal to 'a' that is greater than an operating wavelength(s) 'λ' of the meta-crystal slab and the phrase "operating wavelength" refers to a predefined wavelength or predefined range of wavelengths for which a meta-crystal slab is designed to perform one or more convolutions on.

For reference purposes only, meta-crystal slabs according to the teachings of the present disclosure will be described and discussed using an x-y-z orthogonal reference system, an x-y plane defining a plane that is parallel to an input surface of a given meta-crystal slab, and the z-direction defining a thickness direction of the meta-crystal slab. Accordingly, it should be understood that meta-crystal slabs using other reference systems are included within the teachings of the present disclosure.

Figure 1:
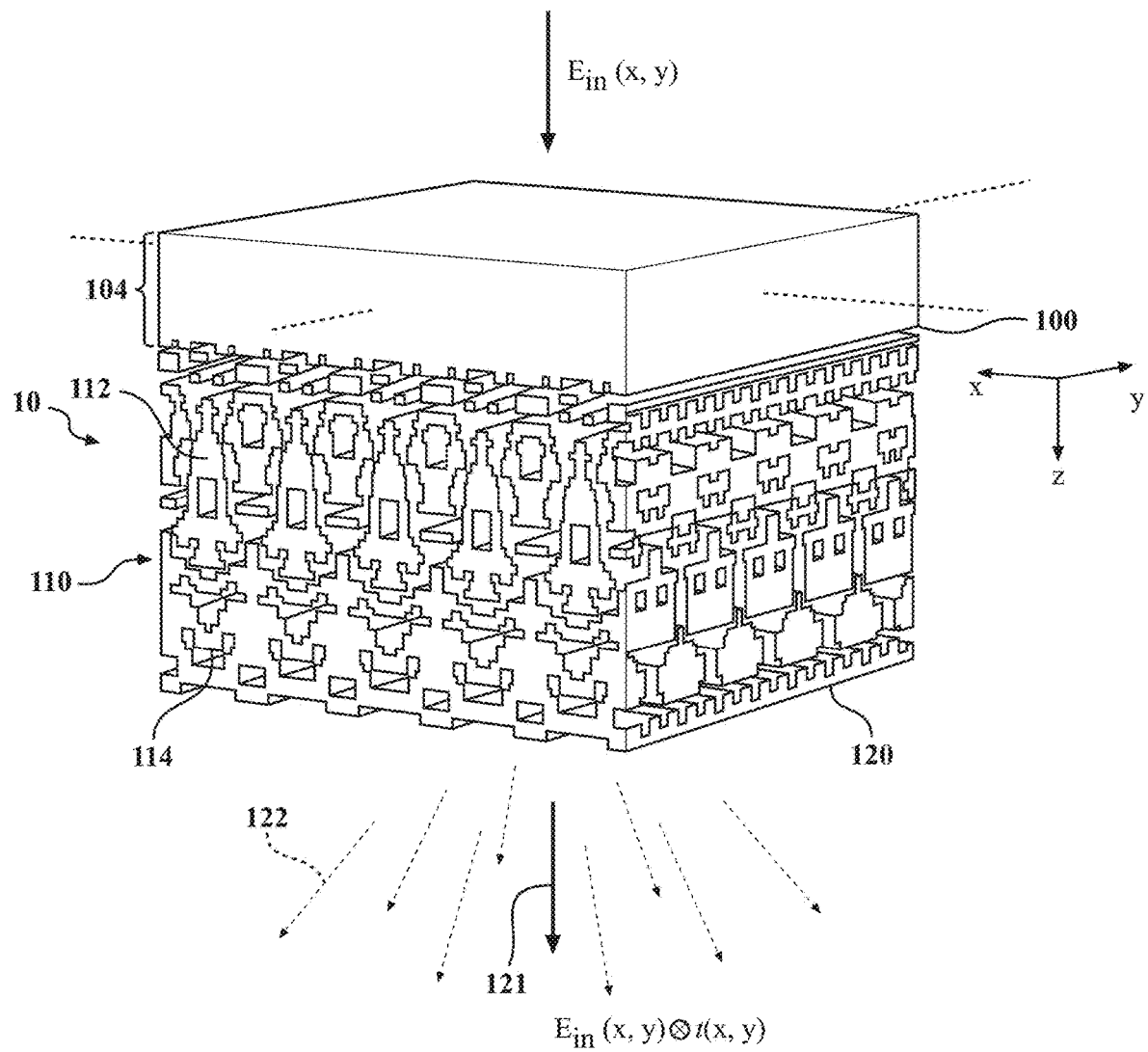
FIG. 1 shows a possible realization of a meta-crystal slab according to the teachings of the present disclosure that provides the transmission function shown in FIG. 4A.

Referring to FIG. 1, a meta-crystal slab 10 according to the teachings of the present disclosure is shown. The meta-crystal slab 10 includes an input surface 100, an output surface 120, and a plurality of voxels 110 disposed between the input surface 100 and the output surface 120. The plurality of voxels 110 include a plurality of first voxels 112 having a first permittivity and a plurality of second voxels 114 (represented as vacant voxels) having a second permittivity that is different than the first permittivity. In some variations, the meta-crystal slab 10 includes a substrate 104 having a permittivity that may or may not be equal to the first permittivity and the input surface 100 is positioned adjacent to the substrate 104 as illustrated in FIG. 1. In the other variations, the meta-crystal slab 10 includes the substrate 104 having a permittivity that may or may not be equal to the first permittivity and an upper surface (+z direction) of the substrate 104 is the input surface 100 (not shown) of the meta-crystal slab 10. And while FIG. 1 illustrates only one substrate 104, it should be understood that in some variations another substrate can be positioned adjacent to a lower (-z direction) surface of the meta-crystal slab 10.

The meta-crystal slab 10 performs convolutions directly on an input optical field $E_{in}(x,y)$ incident on the input surface 100 such that an output field $E_{in}(x,y) \otimes t(x,y)$ is provided, where $\otimes$ denotes the convolution operation and $t(x,y)$ is the convolution kernel. Stated differently, the input field $E_{in}(x,y)$ is convolved with the kernel $t(x,y)$. And while the output field $E_{in}(x,y) \otimes t(x,y)$ can include a normal channel 121 and diffraction channels 122 away from a normal direction (z direction) of the output surface 120, optimization of the position and/or quantity of the plurality of first voxels 112 and the plurality of second voxels 114 suppresses the power in such high order diffraction channels.

In at least one variation, the meta-crystal slab 10 is designed and fabricated to perform convolutions directly on two-dimensional optical fields with an operation defined as:

$$E_{out}(x,y) = \int_{-\infty}^{+\infty} t(x-x', y-y') E_{in}(x',y') dx' dy' \quad \text{Eqn. 1}$$

where $E_{in}(x,y)$ is the input two-dimensional optical field, $t(x,y)$ is a convolution kernel, and $E_{out}(x,y)$ is an output two-dimensional optical field of the unit cell. And in some variations, $E_{in}(x,y)$ and $E_{out}(x,y)$ are assumed to be polarized along the y-direction shown in the figures, and as such, can be represented by complex scalars (e.g., (x+yi), where x and y are real scalars and $i=\sqrt{-1}$. The convolution operation in Eqn. 1 has translational symmetry, and as such, Eqn. 1 can be Fourier transformed into the wavevector domain as:

$$E_{out}(k_x,k_y) = t(k_x,k_y) E_{in}(k_x,k_y) \quad \text{Eqn. 2}$$

where $k_x, k_y$ are wavevector components on the xy two-dimensional plane, and $t(k_x,k_y)$ is the Fourier transform of $t(x,y)$ and corresponds to the transmission coefficients of y-polarized plane waves with the transverse wavevector $(k_x,k_y)$ for the meta-crystal slab 10.

Not being bound by theory, the wavevectors are conserved in Eqn. 2, and as such, optical structures that perform a convolution operation on an incident optical field can use a structure that is periodic in the xy-plane. And while previous studies have chosen the periodicity of the optical structures to be smaller or less than an operating wavelength of incident light from an input two-dimensional optical image, design of meta-crystal slabs using inverse design techniques showed or uncovered that periodic structures with periodicity less than an operating wavelength of incident light do not have sufficient degrees of freedom to achieve or provide general convolution kernels. Accordingly, the meta-crystal slabs according to the teachings of the present disclosure have periodicity larger than the operating wavelength with diffraction losses suppressed using inverse design. As used herein, the phrase "inverse design" or "inverse design technique(s)" refers to reverse engineering the structure of a meta-crystal slab by inputting a desired transmission function and then using one or more optimization algorithms to generate a predicted structure for the meta-crystal slab that provides the desired convolution kernel.

In an effort to better describe the meta-crystal slabs according to the teachings of the present disclosure, but not limit the scope of such meta-crystal slabs and/or the methods of design and fabricating such meta-crystal slabs in any manner, the following examples are provided.

Example 1—First Order Differentiation Kernel with Gaussian Envelope

Referring to FIG. 2A, a unit cell 12 for the meta-crystal slab 10 was designed to provide a convolution kernel containing a Gaussian envelope defined in real space by:

$$t(x,y) = iAxe^{-\left(\frac{x^2+y^2}{\Delta_r^2}\right)} \qquad \text{Eqn. 3}$$

where A is a positive number, $i=\sqrt{-1}$, and $\Delta_r$ is a size parameter of the convolution kernel. It should be understood that the Gaussian envelope allows the convolution kernel to be sensitive to edges with a particular size controlled by the size parameter $\Delta_r$, and makes the edge detection of an input image more robust to noise in the input image.

In wavevector space, using the $e^{iwt-ik\cdot r}$ convention, Eqn. 3 corresponds to:

$$t(k_x, k_y) = -Bk_x e^{-\left(\frac{k_x^2+k_y^2}{\Delta_k^2}\right)} \qquad \text{Eqn. 4}$$

where $$B = \frac{4A}{\Delta_k^2}$$

is a positive number and $$\Delta_k = \frac{2}{\Delta_r}$$

is a size parameter of the convolution kernel in wavevector space. And referring to FIGS. 2B and 2D, a convolution kernel in real space (Eqn. 3) provided by the meta-crystal slab 10 with the unit cells 12 is shown in FIG. 2D and the convolution kernel in wavevector space (Eqn. 4) is shown in FIG. 2B.

Figure 2B:
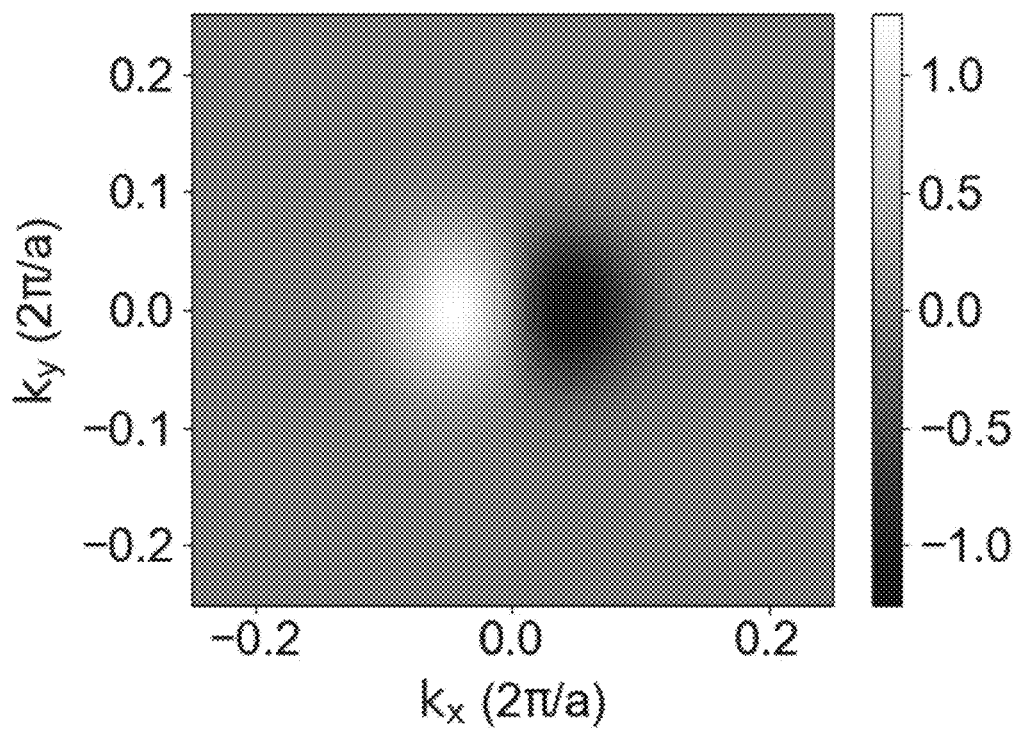
FIG. 2B shows the ideal transmission function for the meta-crystal slab corresponding to FIG. 2A.
Figure 2C:
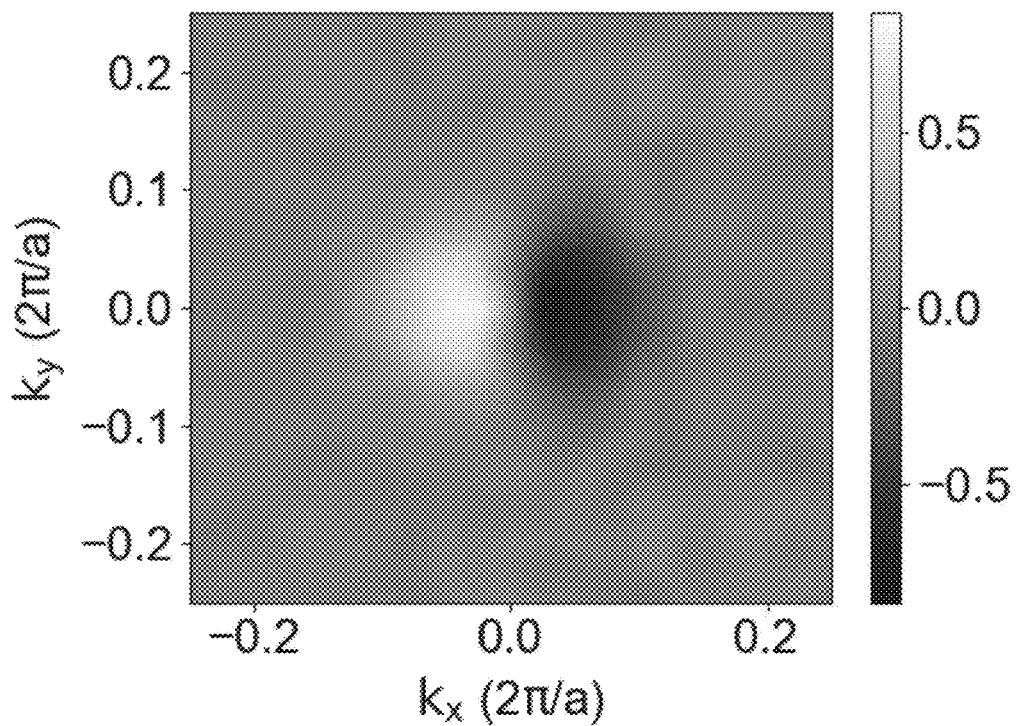
FIG. 2C shows the structural transmission function, after optimization, achieving the desired convolution kernel in FIG. 2B.
Figure 2D:
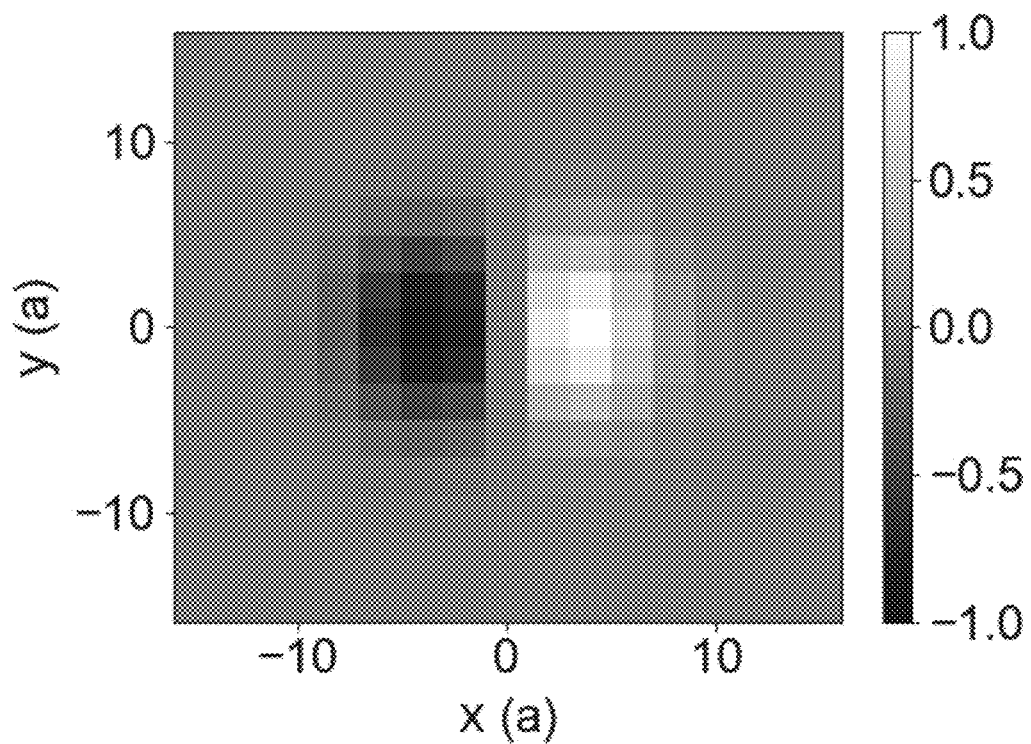
FIG. 2D shows the ideal convolution kernel in real space for the meta-crystal slab corresponding to FIG. 2A.

The design of the unit cell 12 (and thus the corresponding meta-crystal slab with periodic arrangement of unit cells in FIG. 2A) provided the convolution kernels in FIGS. 2B and 2C had a square lattice periodicity in the xy-plane with a lattice constant of 'a'. The meta-crystal cell 10 was positioned adjacent a substrate 104 and assumed to be formed from a material with a permittivity (ϵ) equal to 2.3 such that the input surface 100 was positioned adjacent the substrate 104 and a gas with ϵ=1 (e.g., air) bounded the output surface 120. Light was incident onto the input surface 100 in a near normal direction (z-direction) and the dielectric function of the unit cell 12 and the corresponding meta-crystal slab was adjusted and optimized to achieve the desired convolution operation shown in FIGS. 2B and 2C. Also, the unit cell 12 had dimensions (a, a, 5.4a) and was partitioned into 30×30×45 voxels in the x, y, and z directions, respectively, with isolated layers of the $10^{th}$, $20^{th}$, and $30^{th}$ xy-plane layers shown in FIG. 2A. Throughout the optimization process each voxel was assigned a permittivity value between air (ϵ=1.0) and the material having ϵ=2.3, and at the end of optimization, permittivity values of each voxel were rounded to be either ϵ=2.3 or ϵ=1 such that each voxel was either air or the material with the permittivity equal to 2.3. Accordingly, a meta-crystal slab for providing general convolutions on two-dimensional optical fields can be formed and fabricated from a material with a permittivity equal to 2.3 using one or more 3D printing techniques.

During the optimization process, the loss function:

$$\sum_{j,n} \left| \left( t_{sim,j,n} e^{i\delta} - t_{obj,j,n} \right) \cdot \omega_{j,n} \right|^2 \qquad \text{Eqn. 5}$$

was minimized, where j labeled sample points in 2D space $(k_x, k_y)$ of incident light, n denoted transmission diffraction channels, and $t_{sim,j,n}$ and $t_{obj,j,n}$ were the simulated transmission and objective of transmission at a sampling point, respectively. For zeroth order transmission, $t_{obj,j,o}$ was given by Eqn. (4) and to suppress higher-order diffraction in transmission, $t_{obj,j,n\neq(o,o)}$ was set to zero. The parameter δ compensated the phase degree of freedom in choosing reference planes and $w_{j,n}$ were the weights at sampling points, which for this example were set to unity. The transmission at angular frequency ω=1.7×2πc/a was optimized, and at this frequency, each $(k_x, k_y)$ near normal incidence produced nine diffraction channels 122 (FIG. 1). However, minimization of the loss function ensured the convolution kernel was implemented in the zero-order transmission of the meta-crystal slab and the diffraction channels 122 in transmission were minimized.

Still referring to FIGS. 2B-2C, the transmission function (FIG. 2B) is asymmetric in $k_x$ and thus meta-crystal slab 10 cannot be symmetric in x. However, the convolution kernel (FIG. 2C) is symmetric in $k_y$, and as such, structural symmetry in y was imposed to reduce the degree of freedom in the design region and the number of sampling points needed in the $(k_x, k_y)$ space. And reducing the degrees of freedom reduced the computation demand but is not necessary in general.

In order to obtain the transmission functions in Eq. (5) that were required to compute the loss function, rigorous coupled wave analysis (RCWA) was used with gradients obtained using the autograd package at https://github.com/HIPS/autograd. And to perform optimization on the design parameters, the method of moving asymptotes (MMA, see http://github.com/stevengj/nlopt.) was used. Binarized permittivity distributions were obtained using the projection method as disclosed by Wang et al., "On projection methods, convergence and robust formulations in topology optimization," Structural and Multidisciplinary Optimization 43, 767 (2011), and the density functions in the projection method were initialized as random coherent noise as disclosed by Zhao et al., "Perfect rgb-ir color routers for sub-wavelength size cmos image sensor pixels," Advanced Photonics Research 2, 2000048 (2021), both of which are incorporated herein by reference. Also, the total number of iterations needed for the optimization to converge was between 100 and 200.

Figure 2E:
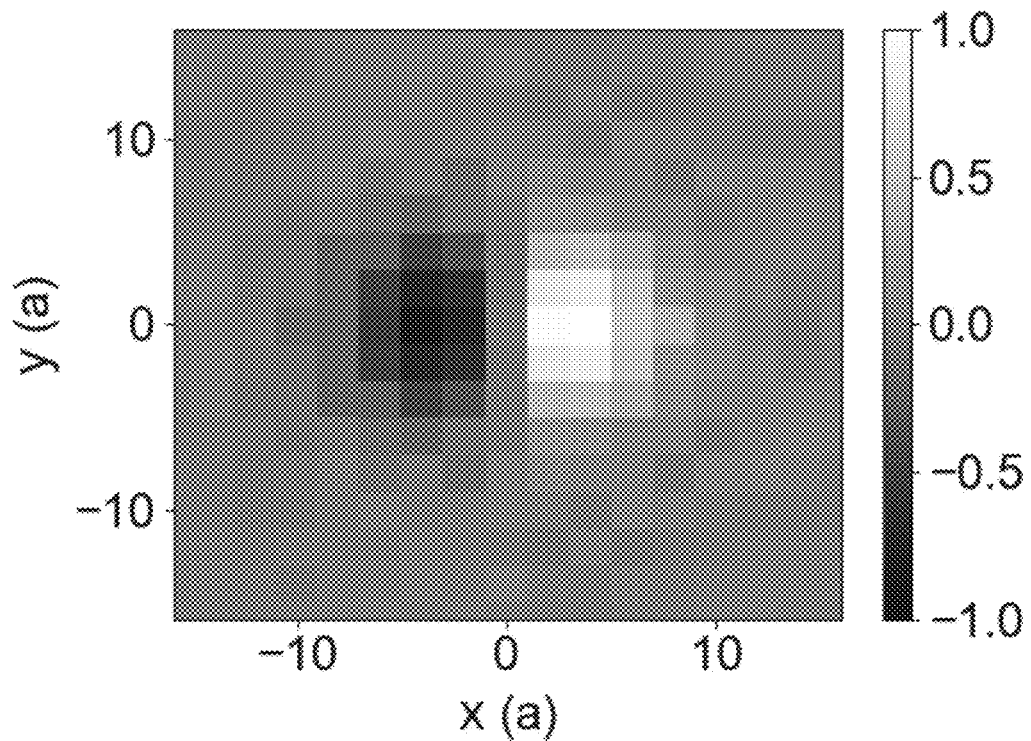
FIG. 2E shows the structural convolution kernel after optimization, achieving the convolution kernel in FIG. 2D.

The zeroth order transmission $t(k_x, k_y)$ of the structure after optimization is shown in FIG. 2D and it is observed that the transmission is very close to the objective (FIG. 2B). The convolution kernel obtained by Fourier transforming the transmission function of the designed structure is shown in FIG. 2E and it is also close to the desired kernel (FIG. 2D). Diffractions in transmission of the designed structure were suppressed during optimization and were near zero.

Figure 2F:
FIG. 2F shows a test input two-dimensional optical field (image)
Figure 2G:
FIG. 2G shows a simulated output two-dimensional optical field (in absolute value) for the test input two-dimensional optical field in FIG. 2F after convolution by the meta-crystal slab composed of unit cell shown in FIG. 2A.

To demonstrate the capability of the meta-crystal slab with a periodic arrangement of unit cells illustrated in FIG. 2A, an image of flowers and leaves (FIG. 2F) with a uniform phase distribution was assumed and used as an input two-dimensional optical field and a simulated output using transmission data in FIG. 2C is shown in FIG. 2G in which the differentiation kernel highlighted the edges of the flowers. In addition, the Gaussian envelope in the kernel also created a scale selectivity with the edges of the leaves occurring on a much smaller scale than the edges of the flowers. That is, the edges of the leaves were greatly suppressed compared to the edges of the flowers.

Figure 3A:
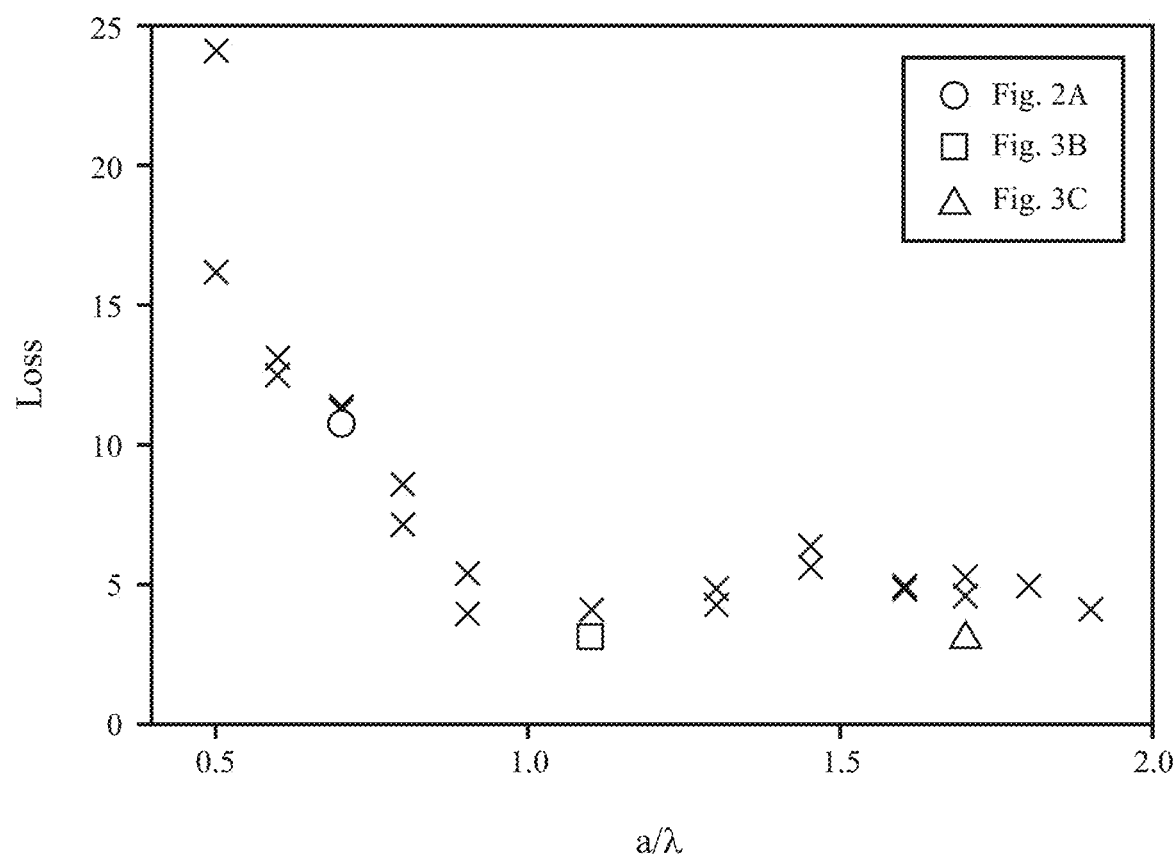
FIG. 3A is a plot of minimized loss function optimized for different values of the ratio a/λ where 'a' is a periodicity and λ is an operating wavelength of the meta-crystal slab in FIG. 2A.

As mentioned above, one important design consideration was the ratio between the periodicity a of the meta-crystal slab 10 and the operating wavelength $\lambda$. Accordingly, values of the minimized loss function defined by Eqn. 5 versus the ration a/$\lambda$ were calculated and plotted as shown in FIG. 3A. The calculations include multiple optimizations at each a/$\lambda$ value to obtain different minimized loss values due to random initialization with all other parameters the same as for Example 1. And as observed from FIG. 3A, with a<$\lambda$, the minimized loss value decreases as A decreases and the main contribution to the loss function being from the transmission function being significantly different from Eqn. 4. And with a>$\lambda$, the minimized loss value does not change significantly with changes in the a/$\lambda$ value and the losses to the loss function mainly due to the transmission maximum being lower than an ideal case and the diffraction in transmission being suppressed and having small contribution to the loss value.

Figure 3B:
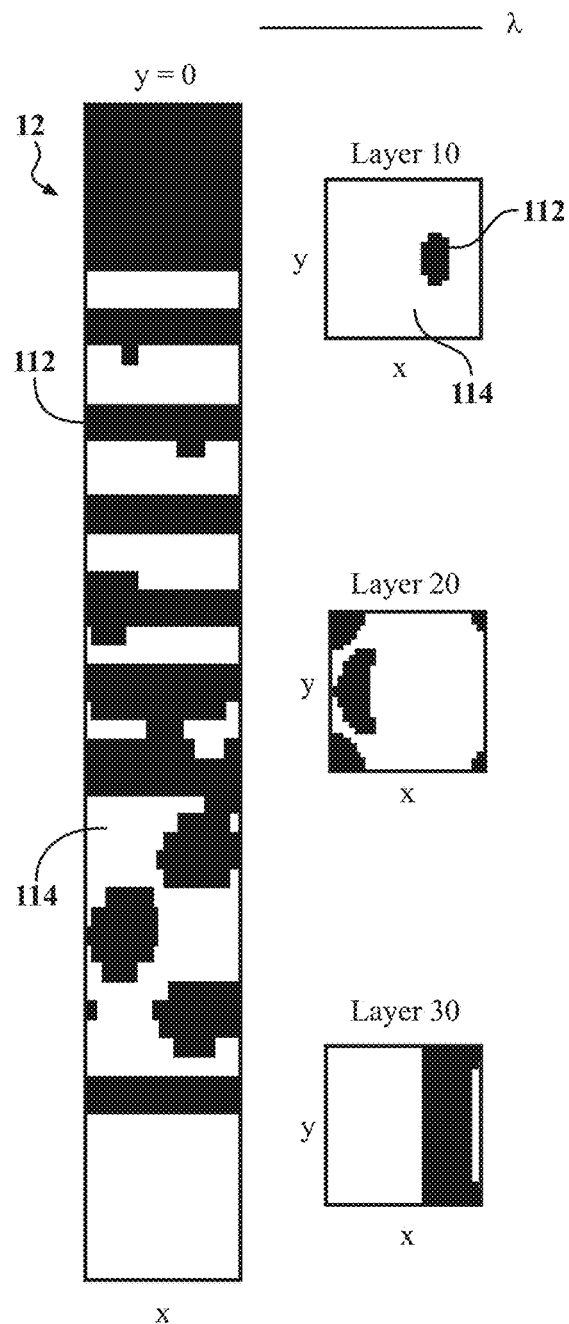
FIG. 3B is a side view of the unit cell in FIG. 2A optimized for the ratio a/λ=0.7.
Figure 3C:
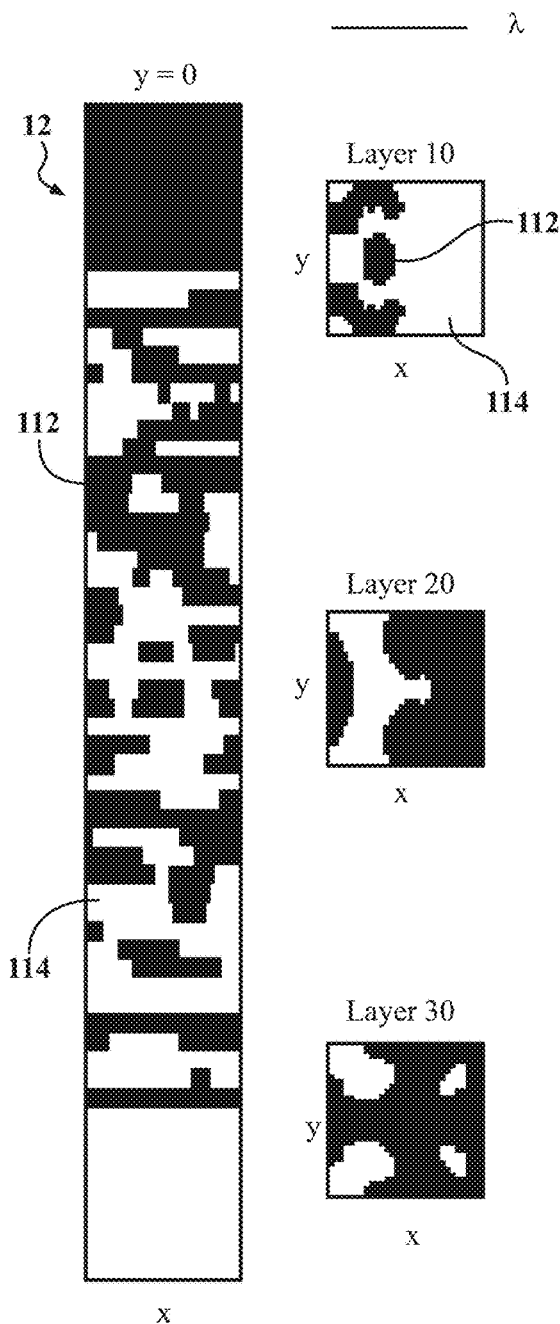
FIG. 3C is a side view of the unit cell in FIG. 2A optimized for the ratio a/λ=1.1.
Figure 3D:
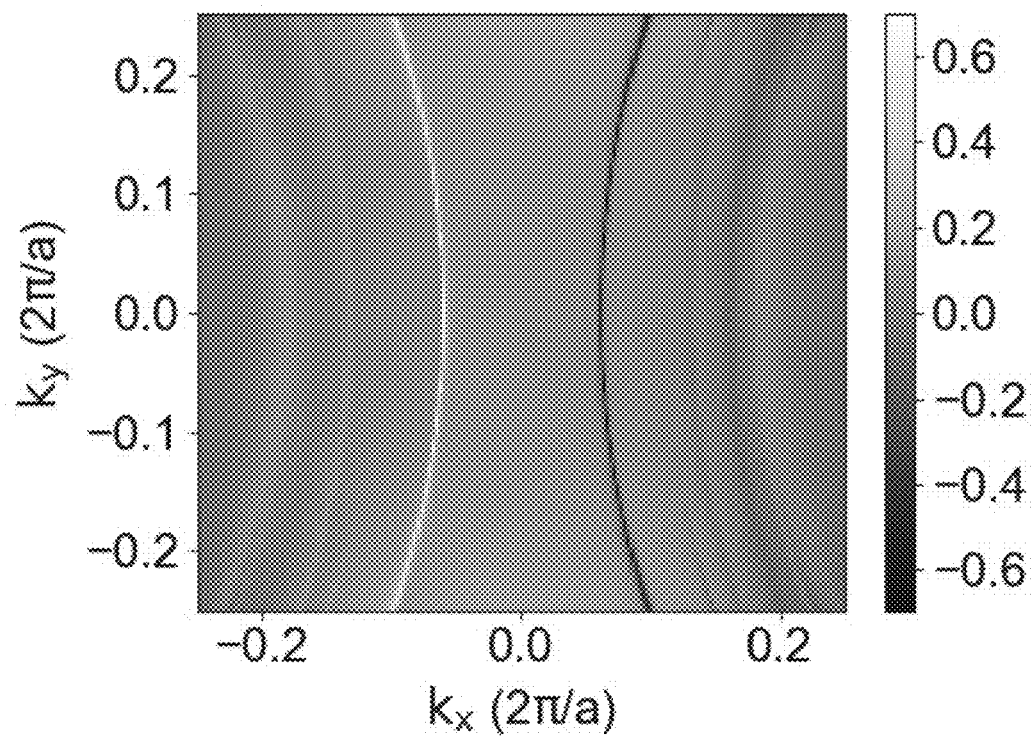
FIG. 3D shows the real part of a zeroth order transmission coefficient for the meta-crystal slab in FIG. 2A optimized for the ratio a/λ=0.7 and as a function of $k_x$ and $k_y$.
Figure 3E:
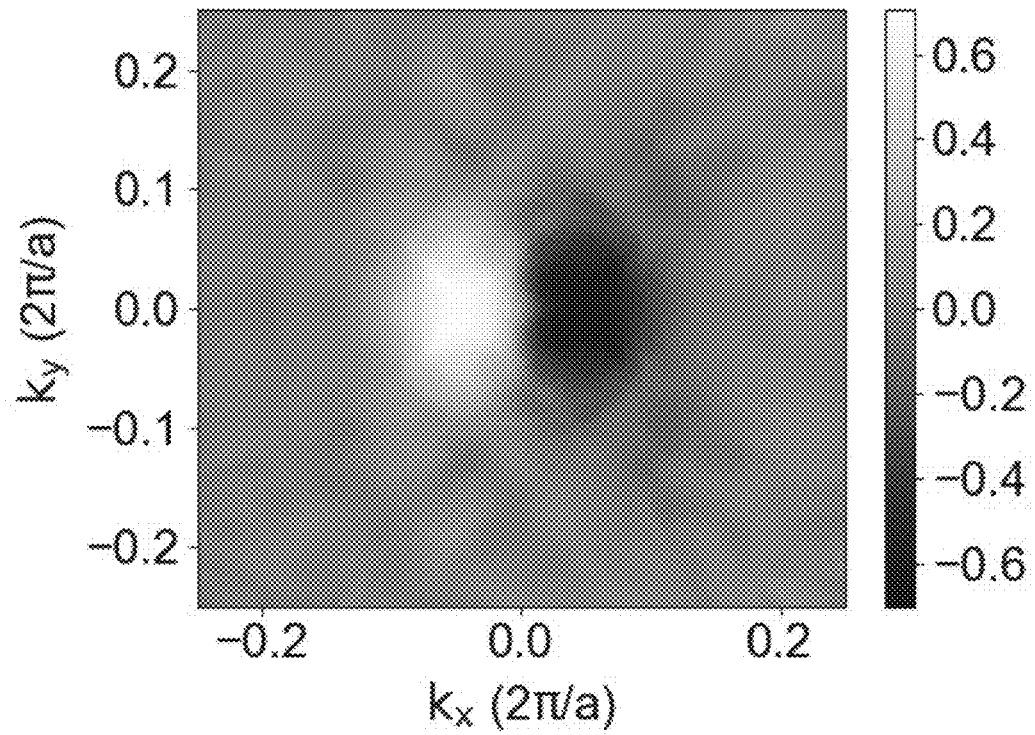
FIG. 3E shows the real part of a zeroth order transmission coefficient for the meta-crystal slab in FIG. 2A optimized for the ratio a/λ=1.1 and as a function of $k_x$ and $k_y$.

Referring to FIGS. 3B and 3C, the two cases of a/$\lambda$=0.7 and a/$\lambda$=1.1 were examined with optimized unit cells for these two cases are shown in FIGS. 3B and 3C, respectively, and detailed images of the $10^{th}$ layer, $20^{th}$ layer, and $30^{th}$ layer also shown. The corresponding zeroth order transmission after optimization was plotted and is shown in FIGS. 3D and 3E, respectively. And as observed from FIG. 3D, for a/$\lambda$=0.7, the wavevector dependency of the transmission of the optimized structure shown in FIG. 3A is far from the desired dependency shown in FIG. 2B. In contrast, for a/$\lambda$=1.1, the wavevector dependency of the transmission of the optimized structure shown in FIG. 3B matches the desired dependency shown in FIG. 2B. Accordingly, the results indicate that to achieve the desired convolution kernel shown in FIG. 2C, a>$\lambda$ is an essential condition.

Figure 4A:
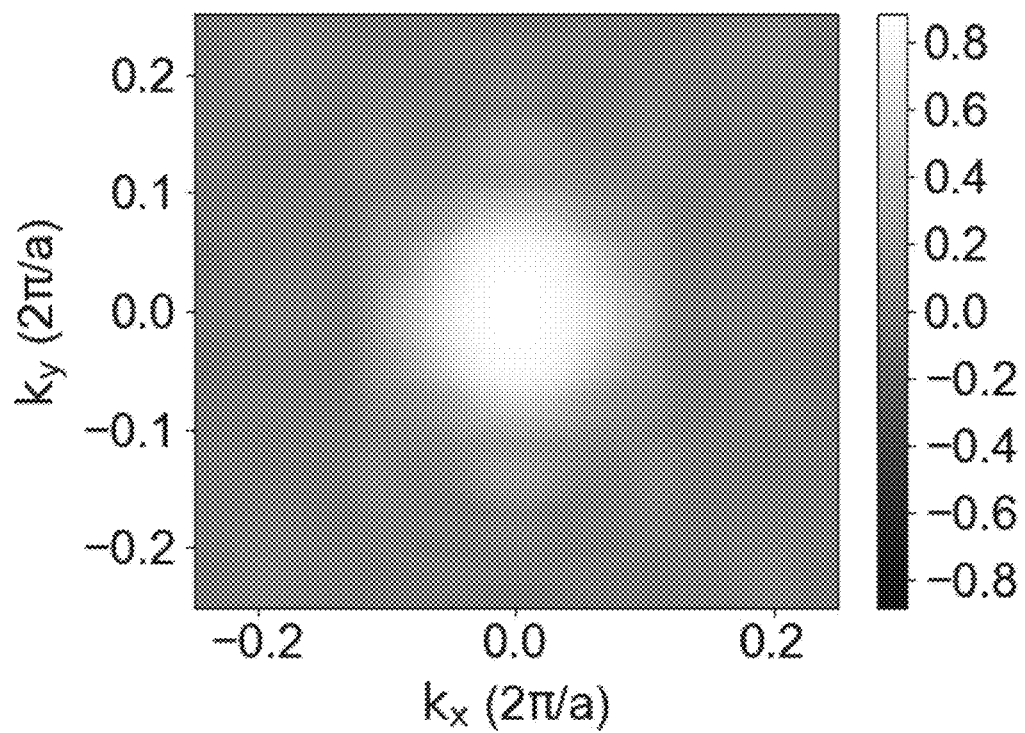
Figure 4B:
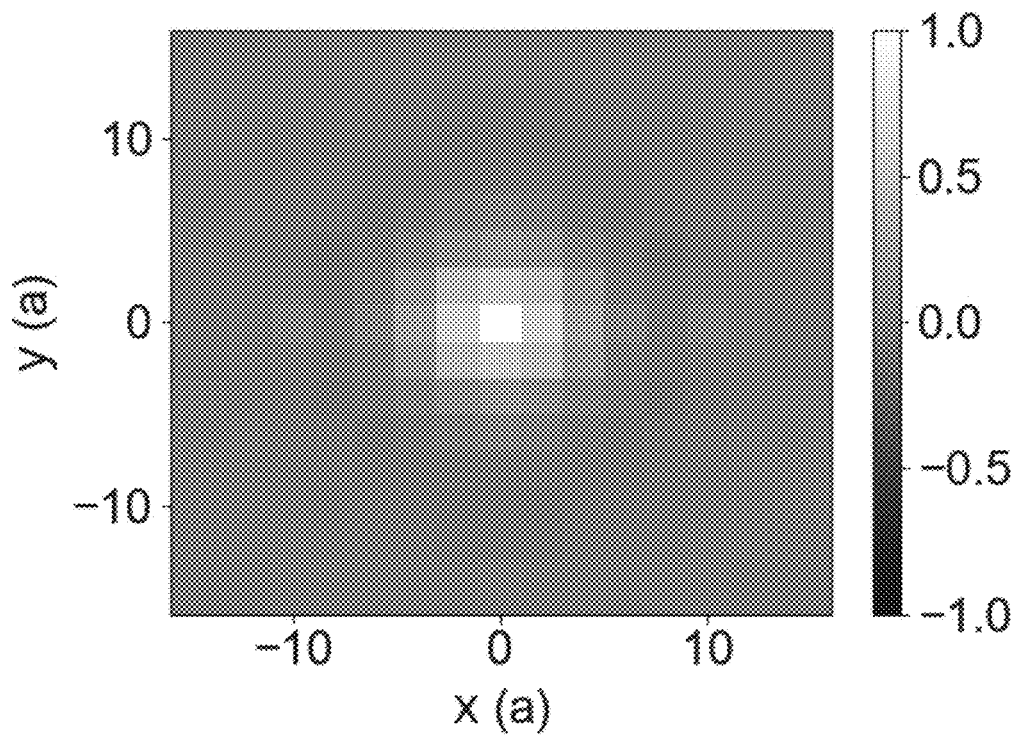
Figure 4C:
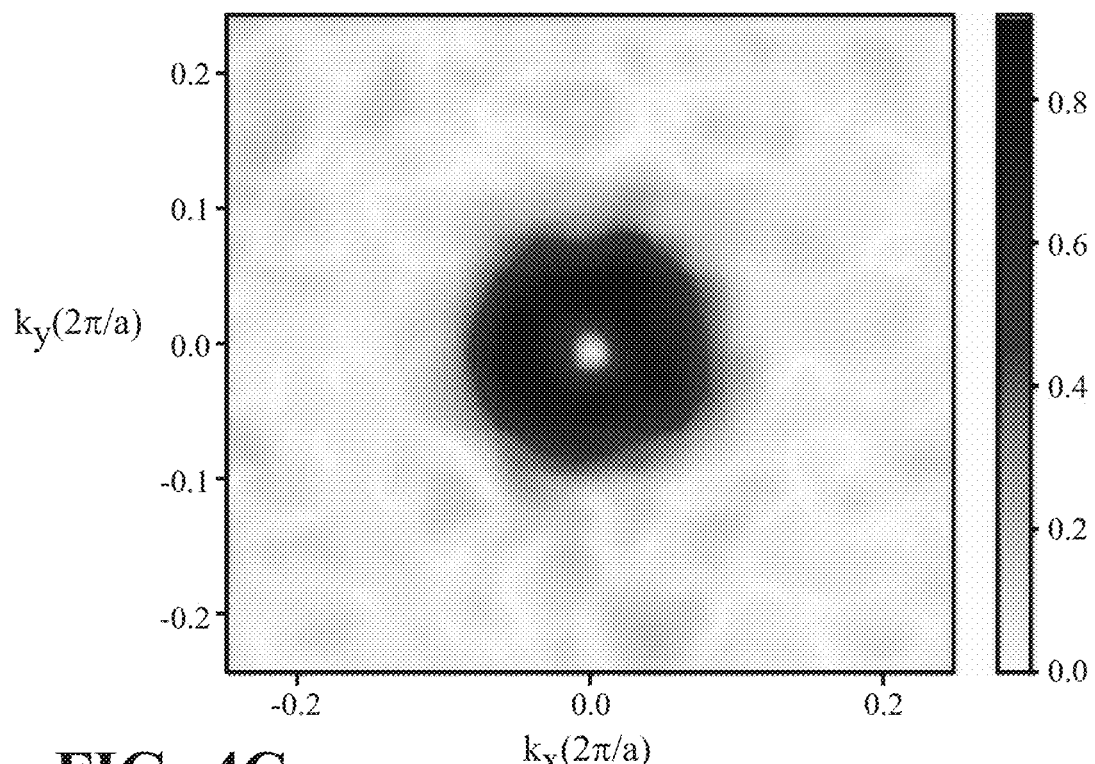
Figure 4D:
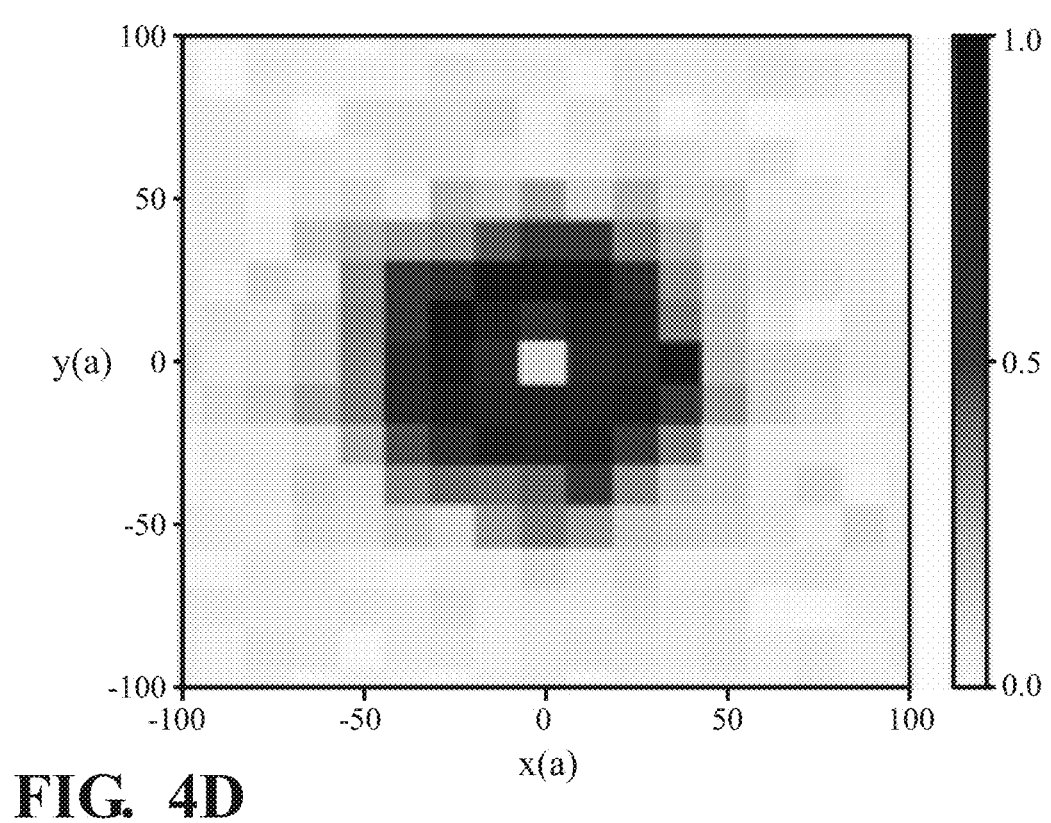
Figure 4E:
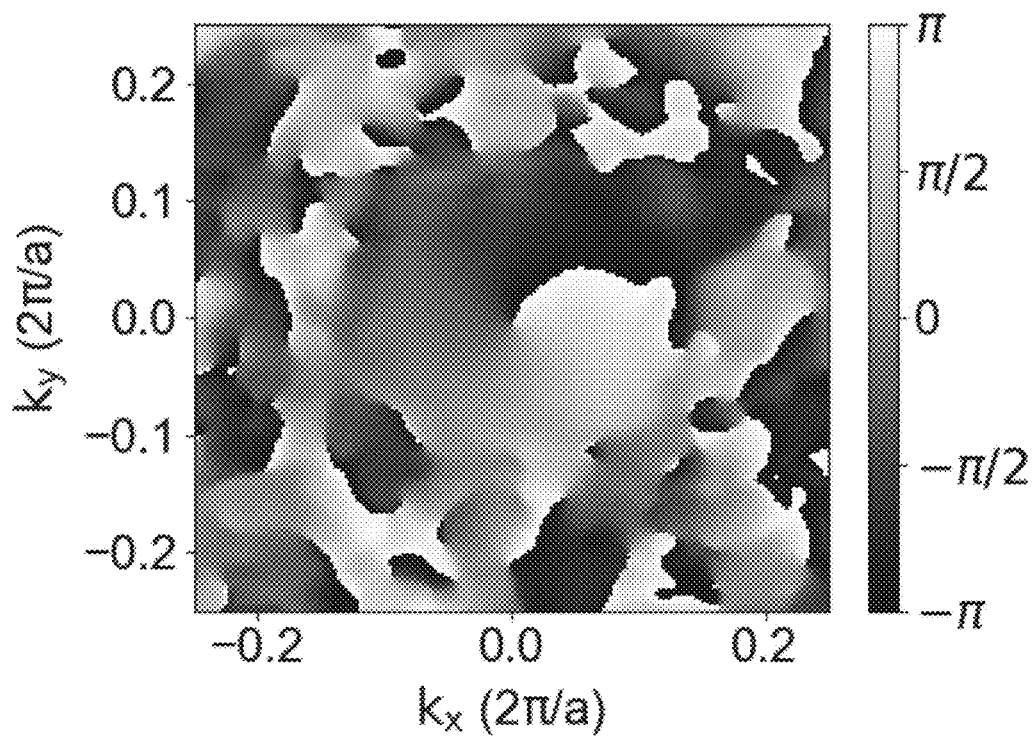
Figure 4F:
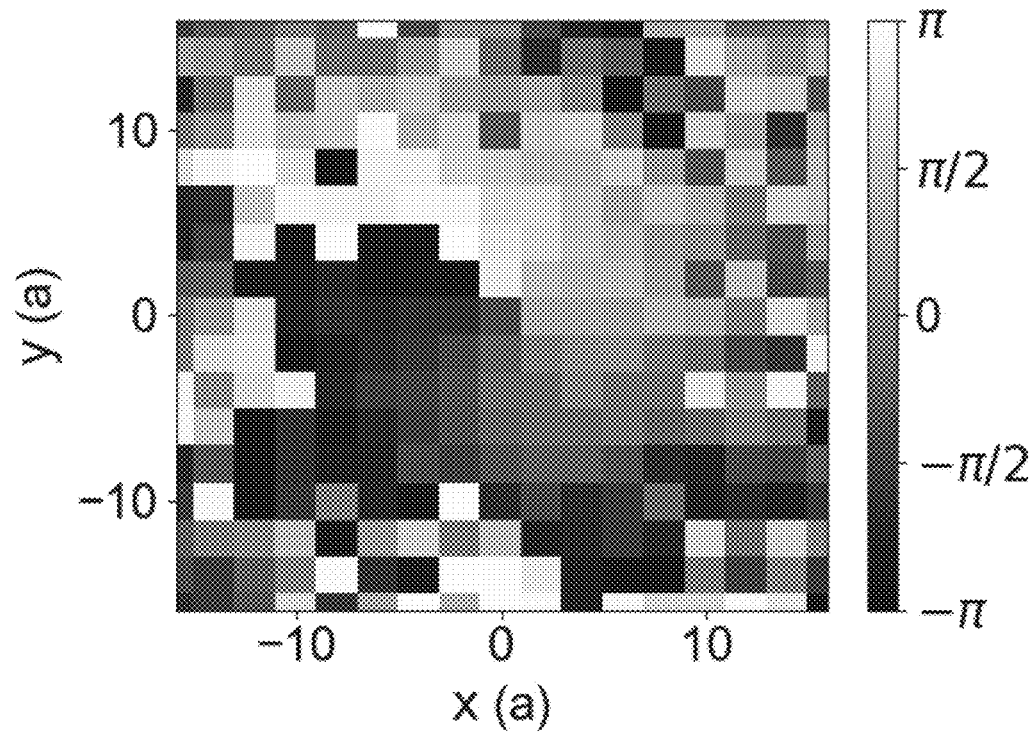
Figure 5A:
FIG. 5A shows a simulated image resulting from passing the test input two-dimensional optical field shown in FIG. 2F through the meta-crystal slab in FIG. 1 designed to provide a Gaussian convolution kernel.

Example 2—Gaussian Blur Kernel and General Differentiation Kernel with Gaussian Envelope The approach, as discussed in the above example, can be used for designing meta-crystal slabs in order to achieve a wide variety of convolution kernels using the same general geometric configuration. For example, structures performing several kernels of the form:

$$t(k_x, k_y) = P((k_x, k_y) \cdot e^{-\left(\frac{k_x^2+k_y^2}{\Delta_k^2}\right)}$$

where $P(k_x, k_y)$ is a polynomial function, $$e^{-\left(\frac{k_x^2+k_y^2}{\Delta_k^2}\right)}$$

describes a Gaussian envelope, and $$\Delta_k = \frac{2}{\Delta_r}$$

is a size parameter of the unit cell, were examined. Particularly, FIG. 4A shows an optimized zeroth order transmission function in the wavevector space of a structure designed to perform a Gaussian blur, where $$P(k_x, k_y) = \sqrt[4]{2.3},$$

this value being due to light propagating from the substrate 104 with $\epsilon$=2.3 to air with $\epsilon$=1. The corresponding convolution kernel in real space is shown in FIG. 4B with the achieved convolution kernel being very close to an ideal Gaussian function and it should be understood that there are several application for this structure. For example, in image processing, Gaussian blur filters are commonly used and the difference of Gaussians (DoG) are used to approximate Laplacian of Gaussian (LoG) kernels. Also, building a series of progressively blurred images is a commonly used procedure in many algorithms, and this can be achieved with the meta-crystal slabs according to the teachings of the present disclosure by repetitively passing a previous output image through a meta-crystal slab. For example, a Gaussian transmission function suppresses transmission when the incidence angle is large, therefore limiting the numerical aperture of the system. And as shown in FIG. 5A, which shows an output image processed by the meta-crystal slab 10 given the input image shown in FIG. 2F, as a prominent signature, the leaves in the image in FIG. 5A are blurred compared to the leaves in the image in FIG. 2F.

Example 3—Topological Differentiation Kernel with Gaussian Envelope

Figure 5B:
FIG. 5B shows a simulated image resulting from passing the test input two-dimensional optical field shown in FIG. 2F through the meta-crystal slab designed to provide a topological differentiation convolution kernel with a Gaussian envelope.

Referring to FIGS. 4C-4F, and in contrast to FIGS. 2B-2E where $P(k_x,k_y) \propto k_x$, a transmission function and convolution kernel for a topological differentiation operation where $P(k_x,k_y) \propto k_x + ik_y$ is shown. Such topological differentiation operation achieves edge detection for edges oriented in all directions. Particularly, using FIG. 2F as an input image the output image from a designed structure is shown in FIG. 5B. And in the output image the Gaussian envelope suppresses the response from small scale features such as the leaves, and topological differentiation produces isotropic edges, which gives rise to the contours of the flowers.

Example 4—Second Order Differentiation Kernels

Figure 4G:
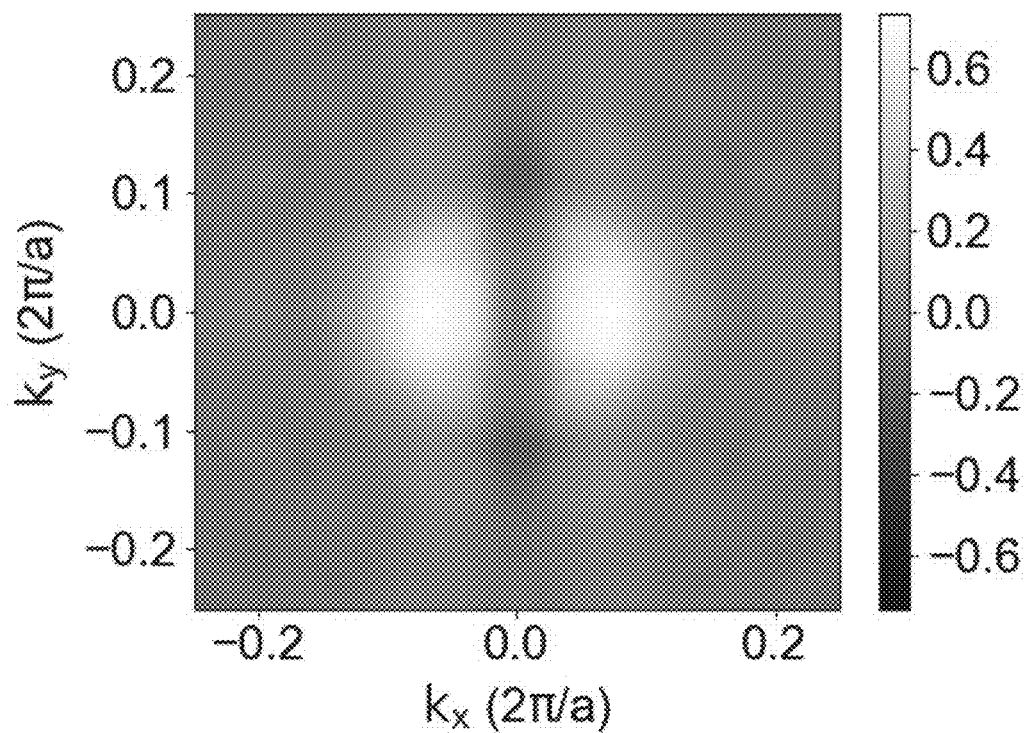
Figure 4H:
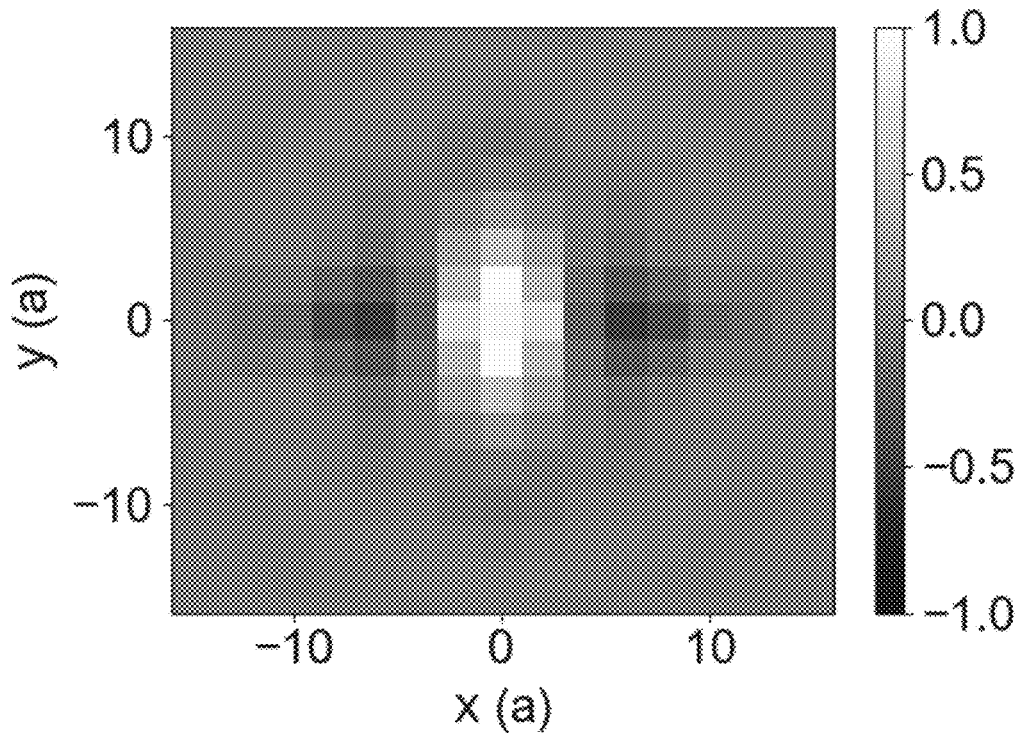
Figure 4I:
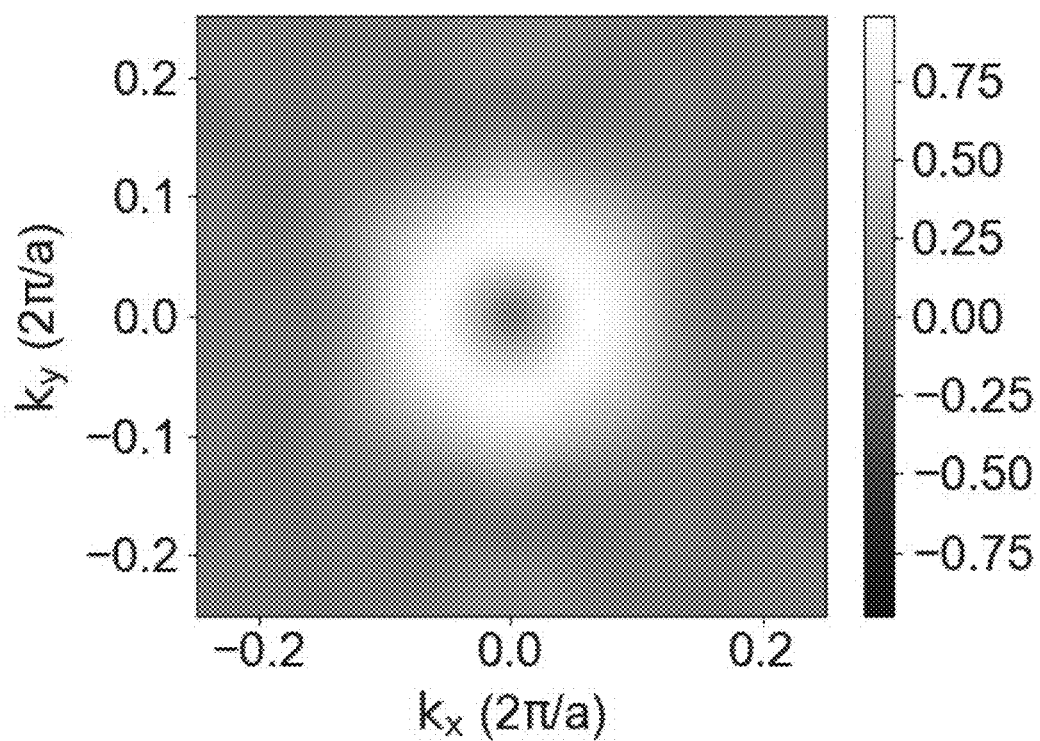
Figure 4J:
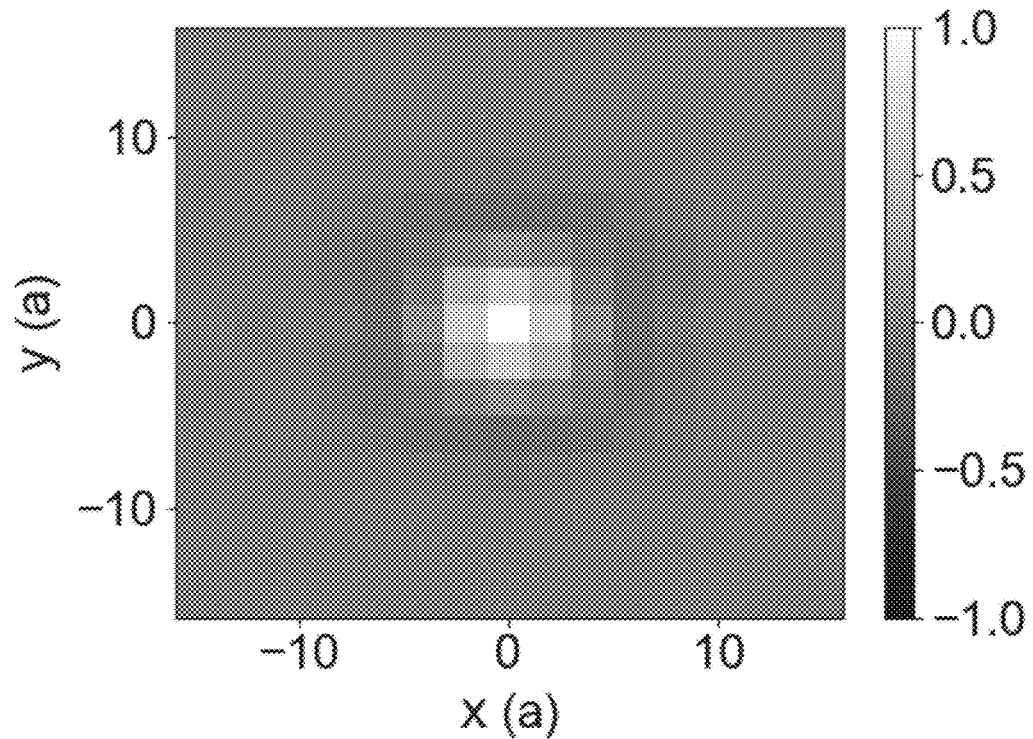
Figure 4K:
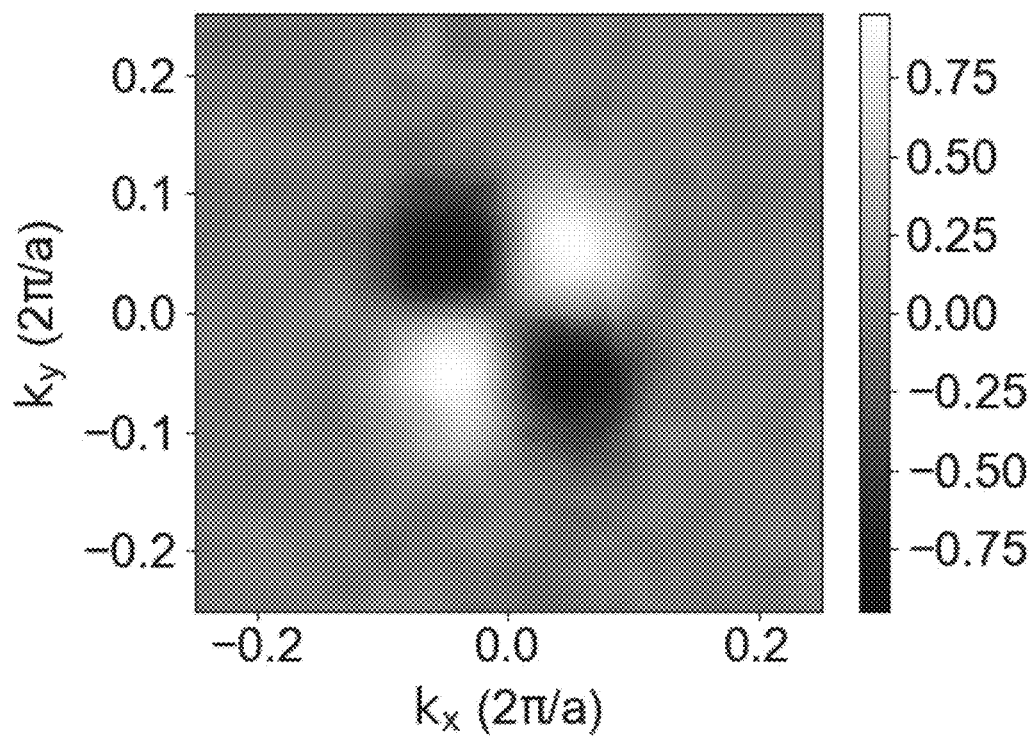
Figure 4L:
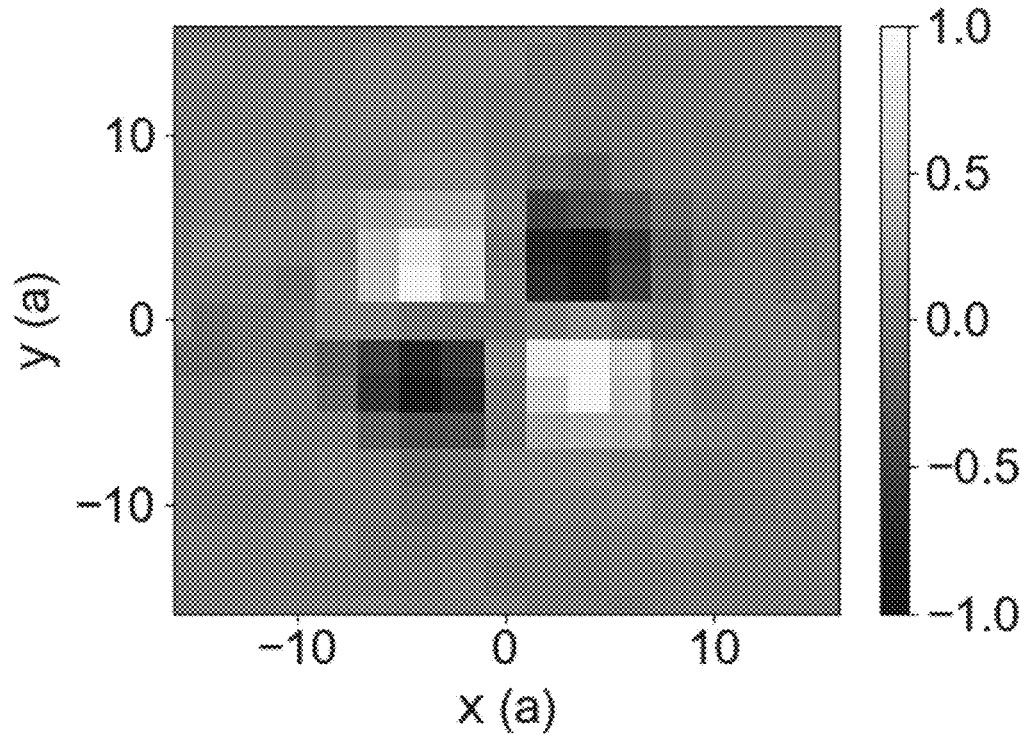

Referring now to FIGS. 4G-4L, transmission functions and convolution kernels for meta-crystal slabs designed with $P(k_x,k_y)$ being a second-order polynomial are shown. Particularly, FIGS. 4G-4H show a transmission function (FIG. 4G) and resulting convolution kernel (FIG. 4H) for the meta-crystal slab 10 designed for one dimensional second order differentiation (i.e., $P(k_x,k_y) \propto k_x^2$), FIGS. 4I-4J show a transmission function (FIG. 4I) and resulting convolution kernel (FIG. 4J) for the meta-crystal slab 10 designed for two dimensional Laplacian operations (i.e., $P(k_x,k_y) \propto k_x^2 + k_y^2$), and FIGS. 4K-4L show a transmission function (FIG. 4K) and resulting convolution kernel (FIG. 4L) for the meta-crystal slab 10 designed for mixed derivative ($\partial_x, \partial_y$) operations (i.e., $P(k_x,k_y) \propto k_x, k_y$). In some variations, the meta-crystal slab 10 per the transmission function and convolution kernel shown in FIGS. 4G-4J are used for edge detection using zero crossings in the output of the meta-crystal slab 10, and the meta-crystal slab 10 per the transmission function and convolution kernel shown in FIGS. 4K-4L are used for key point detection.

Given the above, it should be understood that the meta-crystal slabs according to the teachings of the present disclosure are compact with the largest thickness being 10.4λ, and the smallest thickness being only 5.1λ. In comparison, known convolution filters have thicknesses greater than 50λ, not including additional encoding/decoding needed such designs. In addition, meta-crystal slabs according to the teachings of the present disclosure directly operate on optical images which is advantageous in sensing and imaging applications where information is naturally represented as optical images. Compared with waveguide approaches, directly processing optical images can also increase throughput of image processing devices since there is no need for additional encoding and decoding of the optical images. Finally, meta-crystal slabs according to the teachings of the present disclosure demonstrate convolution kernels with complex phase and amplitude transmission functions can be achieved using inverse design.

It should be understood that the meta-crystal slabs disclosed herein assumed a maximum dielectric having a permittivity close to many polymers and silica. And to fabricate a proposed structure layer-by-layer fabrication techniques can be used, for example, electron-beam lithography, roll-to-roll processing, 3D laser printing and/or maskless lithography. In addition, at least some of the parameters used for the design of the convolution kernels are shown below in Table 1.

application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The flowcharts and block diagrams in the figures illustrate the architecture, functionality, and operation of possible implementations of systems, methods, and computer program products according to various embodiments. In this regard, a block in the flowcharts or block diagrams may

TABLE 1

| Kernel | Transmission function | Unit cell size | Voxel dimension | Symmetry in voxels | ω (2πc/α) | Δk (2π/α) |
|---|---|---|---|---|---|---|
| Gaussian | $\exp\left(-\dfrac{k_x^2 + k_y^2}{\Delta_k^2}\right)$ | α × α × 3.2α | 40 × 40 × 40 | x and y | 1.6 | 0.09 |
| $\partial_x$ | $k_x \exp\left(-\dfrac{k_x^2 + k_y^2}{\Delta_k^2}\right)$ | α × α × 5.4α | 30 × 30 × 45 | y | 1.7 | 0.065 |
| $\partial_x + i\partial_y$ | $(k_x + ik_y)\exp\left(-\dfrac{k_x^2 + k_y^2}{\Delta_k^2}\right)$ | α × α × 6.4α | 18 × 18 × 40 | None | 1.6 | 0.055 |
| $\partial_x^2$ | $k_x^2 \exp\left(-\dfrac{k_x^2 + k_y^2}{\Delta_k^2}\right)$ | α × α × 4.5α | 40 × 40 × 45 | x and y | 1.6 | 0.065 |
| $\partial_x^2 + \partial_y^2$ | $(k_x^2 + k_y^2)\exp\left(-\dfrac{k_x^2 + k_y^2}{\Delta_k^2}\right)$ | α × α × 4.5α | 30 × 30 × 45 | x and y | 1.8 | 0.065 |
| $\partial_x \partial_y$ | $k_x k_y \exp\left(-\dfrac{k_x^2 + k_y^2}{\Delta_k^2}\right)$ | α × α × 6.5α | 16 × 16 × 50 | None | 1.6 | 0.065 |

The preceding description is merely illustrative in nature and is in no way intended to limit the disclosure, its represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A meta-crystal slab comprising:
   a photonic structure with an input surface and an output surface;
   a plurality of first voxels with a first permittivity and a plurality of second voxels with a second permittivity not equal to the first permittivity disposed between the input surface and the output surface; and
   a periodicity equal to 'a', the periodicity being greater than an operating wavelength 'λ' for general convolution by the photonic structure, the photonic structure configured to provide an output image with at least one spatial differentiation of an input image.

2. The meta-crystal slab according to claim 1, wherein the photonic structure is configured to provide a convolution kernel with a Gaussian envelope.

3. The meta-crystal slab according to claim 2, wherein the convolution kernel in real space is given by:

$$t(x, y) = iAxe^{-\left(\frac{x^2+y^2}{\Delta_r^2}\right)},$$

where an x-y plane is parallel to the input surface of the photonic structure, A is a positive number, $i=\sqrt{-1}$, and $\Delta_r$ is a size parameter of the convolution kernel.

4. The meta-crystal slab according to claim 3, wherein the photonic structure is configured to provide the output image with edges of the input image, the edges having a predefined size that is a function of $\Delta_r$.

5. The meta-crystal slab according to claim 1, wherein the photonic structure is configured to provide a convolution directly on an input two-dimensional optical field.

6. The meta-crystal slab according to claim 5, wherein the convolution is defined as:

$$E_{out}(x,y)=\int_{-\infty}^{+\infty} t(x-x',y-y')E_{in}(x',y')dx'dy',$$

where $E_{in}(x,y)$ is the input two-dimensional optical field, $t(x,y)$ is a convolution kernel, and $E_{out}(x,y)$ is an output two-dimensional optical field of the photonic structure.

7. The meta-crystal slab according to claim 6, wherein $$t(x, y) = iAxe^{-\left(\frac{x^2+y^2}{\Delta_r^2}\right)},$$

A is a positive number, $i=\sqrt{-1}$, and $\Delta_r$ is a size parameter of the convolution kernel.

8. The meta-crystal slab according to claim 1, wherein the meta-crystal slab is configured to provide a first order differentiation kernel with a Gaussian envelope in wavevector space given by:

$$t(k_x, k_y) = -Bk_x e^{-\left(\frac{k_x^2+k_y^2}{\Delta_k^2}\right)},$$

where $t(k_x,k_y)$ is a convolution kernel in the wavevector space, $$B = \frac{4A}{\Delta_k^2}$$

is a positive number and $$\Delta_k = \frac{2}{\Delta_r}$$

is a size parameter of the convolution kernel.

9. The meta-crystal slab according to claim 1, wherein the meta-crystal slab is configured to provide a convolution kernel with a Gaussian envelope in wavevector space given by:

$$t(k_x, k_y) = P(k_x, k_y) \cdot e^{-\left(\frac{k_x^2+k_y^2}{\Delta_k^2}\right)},$$

where t($k_x$,$k_y$) is a convolution kernel in the wavevector space, P($k_x$,$k_y$) is a polynomial function, and $$\Delta_k = \frac{2}{\Delta_r}$$

is a size parameter of the convolution kernel.

10. The meta-crystal slab according to claim 9, wherein P($k_x$,$k_y$) is a first-order polynomial function.

11. The meta-crystal slab according to claim 9, wherein P($k_x$,$k_y$) is a second-order polynomial function.

12. The meta-crystal slab according to claim 1, wherein the photonic structure comprises a substrate having the first permittivity adjacent to the input surface and the output surface is bounded by a gas or another substrate.

13. The meta-crystal slab according to claim 12, wherein the gas is air.

14. The meta-crystal slab according to claim 1, wherein the photonic structure has a thickness less than 20 times the operating wavelength λ.

15. The meta-crystal slab according to claim 14, wherein the photonic structure has a thickness less than 15 times the operating wavelength λ.

16. A meta-crystal slab comprising:
a photonic structure comprising:
an input surface and an output surface;
a plurality of first voxels with a first permittivity and a plurality of second voxels with a second permittivity not equal to the first permittivity disposed between the input surface and the output surface; and
a periodicity equal to 'a', the periodicity being greater than an operating wavelength 'λ' for a general convolution by the photonic structure, the photonic structure configured to provide an output image with at least one spatial differentiation of an input image, the at least one spatial differentiation comprising a convolution defined as:

$$E_{out}(x,y) = \int_{-\infty}^{+\infty} t(x-x', y-y') E_{in}(x', y') dx' dy',$$

where $E_{in}(x,y)$ is an input two-dimensional input optical field, t(x,y) is a convolution kernel, and $E_{out}(x,y)$ is an output two-dimensional field from the photonic structure.

17. The meta-crystal slab according to claim 16, wherein the convolution kernel t(x,y) in wavevector space is given by:

$$t(k_x, k_y) = P((k_x, k_y)) \cdot e^{-\left(\frac{k_x^2 + k_y^2}{\Delta_k^2}\right)}$$

where t($k_x$,$k_y$) is a convolution kernel in the wave vector space, P($k_x$,$k_y$) is a polynomial function and $$\Delta_k = \frac{2}{\Delta_r}$$

is a size parameter of the convolution kernel.

18. The meta-crystal slab according to claim 17, wherein P($k_x$,$k_y$) is selected from the group consisting of a first-order polynomial function and a second-order polynomial function.

19. A meta-crystal slab comprising:
a photonic structure comprising:
an input surface and an output surface;
a plurality of first voxels with a first permittivity and a plurality of second voxels with a second permittivity not equal to the first permittivity disposed between the input surface and the output surface;
a periodicity equal to 'a', the periodicity being greater than an operating wavelength 'λ,' for a general convolution by the photonic structure; and
a thickness between the input surface and the output surface, the thickness being less than 20 times the operating wavelength λ, the photonic structure configured to provide at least one spatial differentiation of an input image, the at least one spatial differentiation defined as:

$$E_{out}(x,y) = \int_{-\infty}^{+\infty} t(x-x', y-y') E_{in}(x', y') dx' dy',$$

where $E_{in}(x,y)$ is an input two-dimensional input optical field, t(x,y) is a convolution kernel, and $E_{out}(x,y)$ is an output two-dimensional output field from the photonic structure.

20. The meta-crystal slab according to claim 19, wherein the meta-crystal slab is configured to provide a convolution kernel with a Gaussian envelope in wavevector space given by:

$$t(k_x, k_y) = P((k_x, k_y)) \cdot e^{-\left(\frac{k_x^2 + k_y^2}{\Delta_k^2}\right)}$$

where t($k_x$,$k_y$) is a convolution kernel in the wavevector space, P($k_x$,$k_y$) is a polynomial function selected from the group consisting of a first-order polynomial function and a second-order polynomial function, and $$\Delta_k = \frac{2}{\Delta_r}$$

is a size parameter of the convolution kernel.

\* \* \* \* \*